FACSIMILE SYSTEM WITH SELECTED AREA SCANNING

Filed Jan. 21, 1948 2 Sheets-Sheet 1

Russell G. Thompson
INVENTOR

BY Merton M Perrin
Rolla N. Carter
ATTORNEYS

June 6, 1950 R. G. THOMPSON 2,510,200

FACSIMILE SYSTEM WITH SELECTED AREA SCANNING

Filed Jan. 21, 1948 2 Sheets-Sheet 2

Russell G. Thompson
INVENTOR

BY Newton M. Perrins
Rolla N. Carter
ATTORNEYS

Patented June 6, 1950 2,510,200

UNITED STATES PATENT OFFICE 2,510,200

FACSIMILE SYSTEM WITH SELECTED AREA SCANNING

Russell G. Thompson, Rochester, N. Y., assignor to Eastman Kodak Company, Rochester, N. Y., a corporation of New Jersey Application January 21, 1948, Serial No. 3,435

8 Claims. (Cl. 178—6.6)

This invention relates to the facsimile reproduction of pictures and documents and more particularly to an improved method of operation and apparatus whereby special subjects may be copied to better advantage and more cheaply than heretofore.

In reproducing or copying documents it is frequently desirable to extract for copying purposes selected portions or areas of the document, and it would be very convenient to be able to rearrange or reorganize in the copy the extracted material. Modern businesses increasingly rely on documentary instrumentalities in the conduct of their operations. These instrumentalities usually are discrete documents which are definite in size and shape, and the information or data contained thereon is located in accordance with its subject matter. This means that if selected areas of a document or card can be reproduced, the material copied may be limited to what is desired and it will not be necessary to reproduce the whole document nor even continuous areas thereof.

The primary object of the invention, therefore, is the provision of a facsimile method and apparatus which make it possible to copy selected non-continuous areas of an optical image.

Another object of the invention is the provision of facsimile scanning apparatus which will scan spaced bands without scanning the spaces between the bands, thereby economizing on time.

A still further object of the invention is to provide a facsimile method and apparatus for copying address labels from business machine cards whereby the ratio between letter height and the vertical spacings between letters may be altered.

The invention will be understood from the following description when read in connection with the drawings, and its scope will be pointed out in the appended claims.

In accordance with the form of the invention to be described in detail, the scanning unit comprises a stationary plate provided with a transverse aperture and a rotatable drum provided with a helical slit, an objective is provided to project the image of the document into the transverse slot and the helical slit, an optical means in the form of a prism is located in the path of the objective for reducing only the space between respective lines on the document being scanned, and a means for deriving a continuous signal from the scanning means is utilized for actuating a facsimile recorder.

Reference is now made to the accompanying drawings wherein like reference numerals designate similar parts and wherein.

Figure 1:
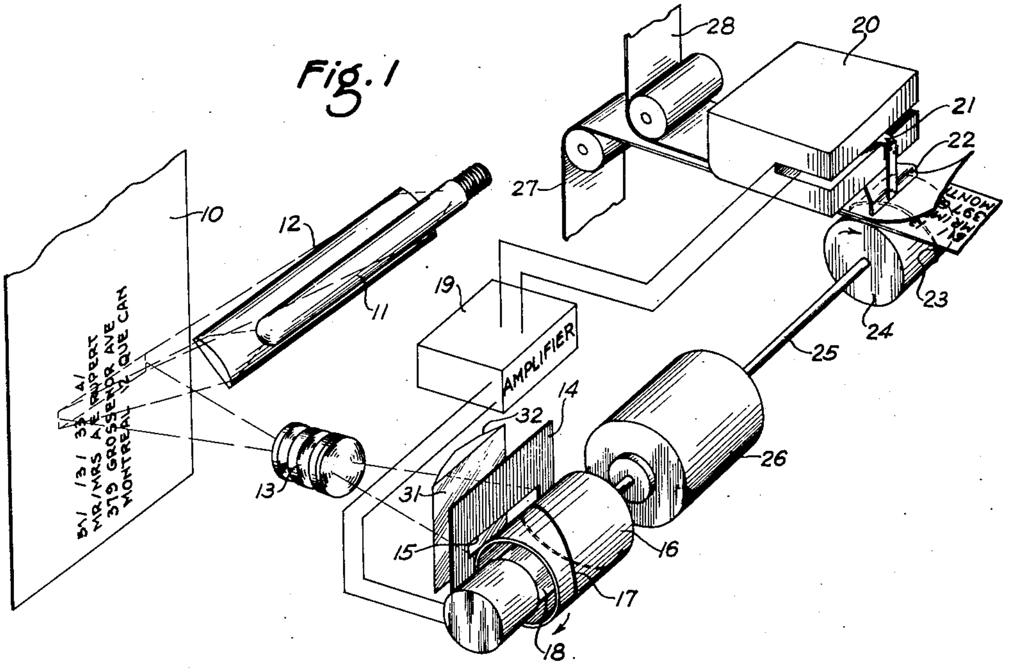
Fig. 1 is a schematic perspective view of a facsimile apparatus embodying the invention and adapted to practise the method of the invention.

In the apparatus illustrated a card 10 bearing an address to be copied is illuminated by a suitable system shown as comprising a lamp 11 and a cylindrical condensing lens 12 and is imaged by an objective 13 onto a plate 14 having a transverse aperture 15 which cooperates with a rotatable drum 16 provided with a helical slit 17 to form a scanning device. Light from the image transmitted by the aperture 15 and the slit 17 is caused to fall on a light sensitive cell reflected from the elemental areas of the card 10 as it is scanned. This signal from the cell 18 is suitably amplified by an amplifier 19 and fed to any well-known facsimile recorder and is here shown as an electromagnetic device 20 having an armature 21 which drives a straight edge 22 in such a manner that it is forced down on dark signals and lifted on light signals. Now with a printing anvil placed beneath the straight edge 22 and moved in synchronism with the scanning drum 16, a straightforward recording head is provided through which a recording medium may be passed. As shown, the printing anvil comprises a helical ridge 23 carried on a drum 24 mounted on the shaft 25 of a motor 26. The scanning drum 16 is also mounted on the shaft of the motor 26, and thus once the two drums 16 and 24 are secured to this shaft in proper relation, synchronism is automatic. A strip of paper 27 and an overlying strip of carbon paper 28 are passed between the signal vibrated bar 22 and helical printing anvil 23 to record in a well-known manner.

Figures 5, 6, 7:
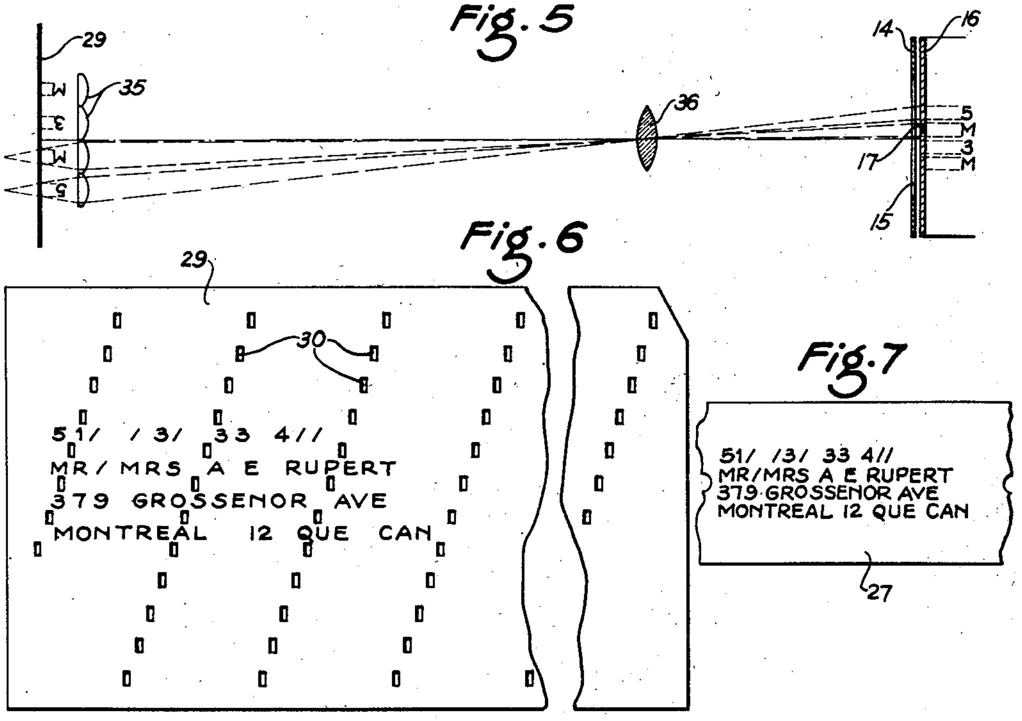
Fig. 5 is a partial schematic view of a facsimile apparatus showing another embodiment of the invention in which the prisms shown in Fig. 4 are replaced by cylindrical lens elements.
Fig. 6 shows fragments of a business machine card carrying an address to be copied.
Fig. 7 shows an address label copied from the card of Fig. 6 with the apparatus of Fig. 1.

When it is desired to record on the tape 27 an address such as is carried on a card 29 of the type shown in Fig. 6, it is apparent that the spacings between the lines of print are greater than needed for address labels and that these spaces include several of the perforations 30 representing data stored on the card 29. The present invention makes it possible to produce from the card 29 an address label on the paper tape 27 in the form shown in Fig. 7 in a manner now to be described.

Figure 2:
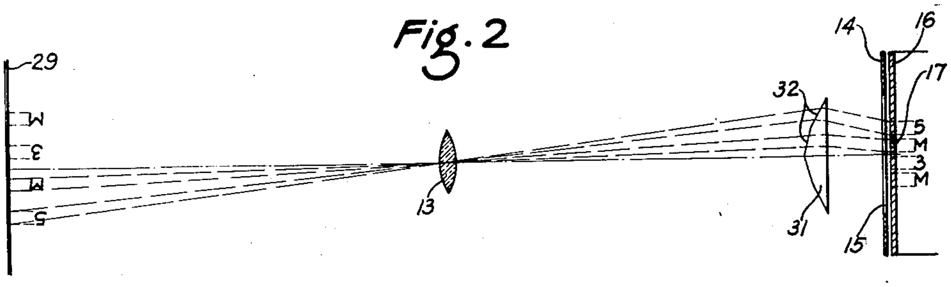
Fig. 2 is a partial schematic arrangement of a facsimile apparatus showing the preferred embodiment of the invention for varying the ratio between the letter height and vertical spacings between the letters.

In order to reduce the space between the printed matter on the card 29 and at the same time eliminate the perforations 30, a single prism 31 of the form best shown in Figs. 1 and 2 is placed in the optical path of the objective 13 and in front of the plate 14. The prism 31 is provided with a plurality of refracting faces 32 corresponding to the number of lines being scanned. It will be noted from Fig. 2 that the prism does not alter the height of the letters on the card 29, but bends the image projected by the objective toward the optical center line so that only the spacing between the lines of letters is changed. This means that the letters are displaced longitudinally of the drum 16 and toward the optical center line of the objective 13 by a distance almost equal to the spaces between the printed lines on the card 29 so that for each revolution of the drum 16 a discontinuous line is scanned across the address on the card 29. It should be pointed out that although the scanning line is discontinuous in space, it is continuous in time because the slit 17 is continuously traversing the aperture 15.

Figure 3:
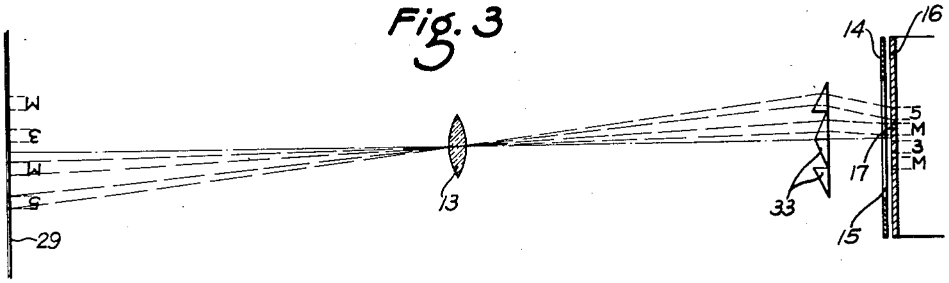
Fig. 3 is another partial schematic view of a facsimile apparatus showing another embodiment of the invention shown in Fig. 2.

In Fig. 3 another embodiment of the invention is disclosed in which individual prisms 33 are arranged in front of the plate 14 for reducing the spacing between the printed lines on the card 29. The arrangement shown in Fig. 4 discloses individual prisms 34 arranged in front of the card 29 or between the lens 13 and the card 29. The use of cylindrical lenses for reducing the spacing between the printed lines is disclosed in Fig. 5 with a plurality of positive cylindrical lenses 35 located between the card 29 and the objective 36. In this arrangement the card 29 is positioned inside the focal point of the lenses 35 so that the printed lines are magnified slightly by the lenses 35. This magnified image of the printed lines is then reduced by the lens 36, which has unequal conjugates, so that the image received by the drum 16 is again unity with the spaces therebetween reduced in size.

Figure 4:
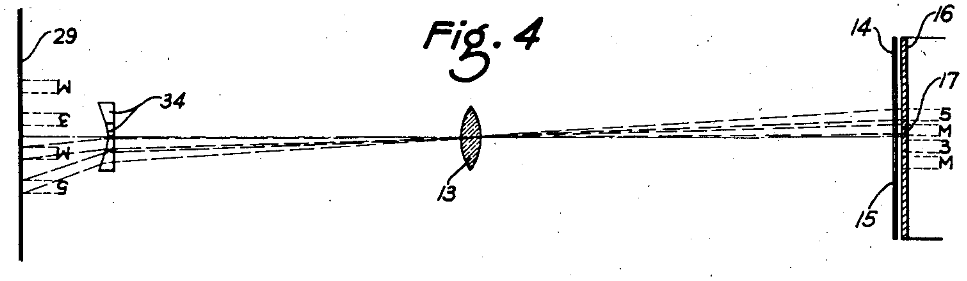
Fig. 4 is a partial schematic view of a facsimile apparatus showing still another embodiment of the invention.

It will be noted from Figs. 2 and 4 that when the prism or prisms are located between the objective 13 and the drum 16, the refracting faces of the prism form a substantially concave surface, whereas when the prisms are placed between the card 10 and the objective 13, the refracting faces form a substantially convex surface. Also it is to be understood that a plurality of negative cylindrical lenses may also be used but would be positioned near the drum 16 rather than near the card 29.

Figure 8:
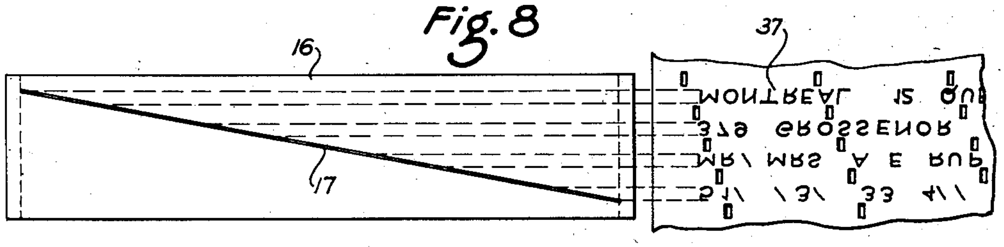
Fig. 8 is a view showing the development of the scanning drum of Fig. 1 and its relation to an image to be scanned.
Figure 9:
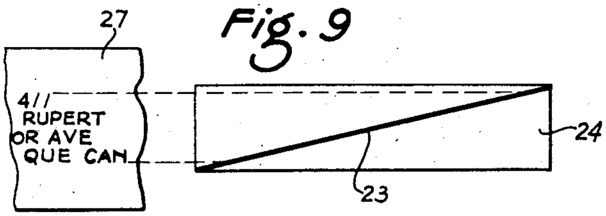
Fig. 9 is a view showing the development of the printing drum and its relation to the copy printed thereby.

The above scanning operation is illustrated in Fig. 8 wherein a development of the drum 16 is shown in its relationship to an image 37 of the card 29. Similarly, Fig. 9 shows in development the relationship between the printing anvil 23 and a fragment of the tape 27 which has just been recorded. It will be noted by reference to Fig. 1 that the recorded matter on the tape 27 is a mirror image of the image 37 scanned by the drum 16.

While the invention has been described in connection with the reproduction of four spaced lines of printed matter carried on a punched card, it is to be understood that the invention is not to be restricted to the particular embodiments shown since these have been chosen for the purpose of illustrating the invention and many other modifications will readily be suggested to those skilled in the art. The ratio of the height of the letter to the space between the printed lines may also be varied mechanically during facsimile reproduction as disclosed in the United States patent application, Serial No. 3,427, filed concurrently herewith by Clayton E. Hunt, Jr. It is also to be understood that the showing herein is not a working drawing for building a complete machine but is for the purpose of explaining the invention to one skilled in this art. It would tend to obscure rather than reveal the invention if the drawing showed complete mechanical details such as extraneous light excluding casings around the pick-up scanning head, advancing means for the paper tape 27 and the carbon paper 28, document feeding means and various supporting structures. The recording device is preferably the structure and invention disclosed in my application, Serial No. 795,073, filed December 31, 1947, now abandoned.

It will be apparent from the foregoing that the invention can readily be embodied in many different forms, and it is intended to cover generically by the appended claims all modifications within the scope of the invention, including those disclosed and specifically claimed in the said Hunt application.

Having now particularly described my invention what I desire to secure by Letters Patent of the United States and what I claim is:

1. In the facsimile reproduction of predetermined spaced parallel areas of a document, the method comprising moving the document in a direction longitudinally of said spaced areas, forming images of said areas in contiguous relation, scanning said images line by line transversely of said areas, deriving electric signal current from each scanning line, and supplying said signal current to a facsimile recorder.

2. In facsimile apparatus for the reproduction of predetermined spaced parallel areas of a document, the combination, comprising an optical means for imaging said areas in contiguous relation, scanning means for transversely scanning said images, means for deriving a signal from said scanning means, and a facsimile recording means actuated by said signal.

3. In facsimile apparatus for the reproduction of predetermined spaced parallel areas of a document, the combination comprising scanning means for scanning the document transversely of said areas, an objective for forming images of said spaced areas in the plane of said scanning means, optical means for displacing said images into contiguous relation, means for deriving a continuous signal from said scanning means, and a facsimile recording means actuated by said signal.

4. In facsimile apparatus for the reproduction of predetermined spaced parallel areas of a document, the combination comprising scanning means including a plate provided with a transverse aperture and a rotatable drum provided with a helical slit, an objective for forming images of said spaced areas in the plane of said transverse aperture, optical means for displacing said images into contiguous relation, means for deriving a continuous signal from said scanning means, and a facsimile recording means actuated by said signal.

5. In facsimile apparatus for the reproduction of predetermined spaced parallel areas of a document, the combination comprising scanning means including a plate provided with a transverse aperture and a rotatable drum provided with a helical slit for scanning said document transversely of said areas, an objective for forming images of said spaced areas in the plane of said transverse aperture, optical means including a plurality of elements equal in number to the number of spaced areas for displacing said images into contiguous relation, means for deriving a continuous signal from said scanning means, and a facsimile recording means actuated by said signal.

6. In facsimile apparatus for the reproduction of predetermined spaced parallel areas of a document, the combination comprising scanning means including a plate provided with a transverse aperture and a rotatable drum provided with a helical slit for scanning said document transversely of said areas, an objective for forming images of said spaced areas in the plane of said transverse aperture, a prism having a plurality of light deviating surfaces equal in number to the number of spaced areas and displacing said images in contiguous relation, means for deriving a continuous signal from said scanning means, and a facsimile recording means actuated by said signal.

7. In facsimile apparatus for the reproduction of predetermined spaced parallel areas of a document, the combination comprising scanning means including a plate provided with a transverse aperture and a rotatable drum provided with a helical slit for scanning a line defined by said aperture, an objective for forming images of said spaced areas in the plane of said transverse aperture, a plurality of prisms equal in number to the number of said spaced areas deviating said images into contiguous relation, means for deriving a continuous signal from said scanning means, and a facsimile recording means actuated by said signal.

8. In facsimile apparatus for the reproduction of predetermined spaced parallel areas of a document, the combination comprising scanning means including a plate provided with a transverse aperture and a rotatable drum provided with a helical slit for scanning said document transversely of said areas, cylindrical lenses for forming contiguous virtual images of said areas, an objective for imaging said virtual images at said aperture, means for deriving a continuous signal from said scanning means, and a facsimile recording means actuated by said signal.

RUSSELL G. THOMPSON.

REFERENCES CITED

The following references are of record in the file of this patent:

UNITED STATES PATENTS

| Number | Name | Date |
|---|---|---|
| 1,834,330 | Brower | Dec. 1, 1931 |
| 2,202,359 | Tauschek | May 28, 1940 |
| 2,287,413 | Bruce | June 23, 1942 |
| 2,357,674 | McConnell | Sept. 5, 1944 |